(12) United States Patent
Askeland

(10) Patent No.: US 9,727,054 B2
(45) Date of Patent: Aug. 8, 2017

(54) IMPEDANCE MEASUREMENT BEHIND SUBSEA TRANSFORMER

(71) Applicant: ONESUBSEA IP UK LIMITED, London (GB)

(72) Inventor: Audun Magne Askeland, Bergen (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 14/631,634

(22) Filed: Feb. 25, 2015

(65) Prior Publication Data

US 2016/0245051 A1    Aug. 25, 2016

(51) Int. Cl.
*E21B 47/00*    (2012.01)
*G05B 23/02*    (2006.01)
*E21B 43/12*    (2006.01)

(52) U.S. Cl.
CPC ........ *G05B 23/0256* (2013.01); *E21B 43/128* (2013.01); *E21B 47/0007* (2013.01)

(58) Field of Classification Search
CPC ....................................................... E21B 43/01
USPC ......................................................... 166/338
See application file for complete search history.

(56) References Cited

U.S. PATENT DOCUMENTS

| | | |
|---|---|---|
| 1,923,727 A | 8/1933 | Hodnette |
| 3,760,314 A | 9/1973 | Krasienko et al. |
| 4,138,699 A | 2/1979 | Ura et al. |
| 4,975,797 A | 12/1990 | Veverka et al. |
| 5,131,464 A | 7/1992 | Lenhart et al. |
| 5,179,489 A | 1/1993 | Oliver |
| 5,324,886 A | 6/1994 | Nakatake et al. |
| 5,699,219 A | 12/1997 | Arita et al. |
| 6,188,552 B1 | 2/2001 | Jaeschke et al. |
| 6,580,783 B1 | 6/2003 | Swale |
| 6,595,487 B2 | 7/2003 | Johansen et al. |
| 6,867,364 B2 | 3/2005 | Hafskjold et al. |
| 7,301,739 B2 | 11/2007 | Hamer |
| 7,516,795 B2 | 4/2009 | Lopes Euphemio et al. |
| 7,847,189 B2 | 12/2010 | Findeisen |
| 8,439,080 B2 | 5/2013 | Uusipaikka |
| 8,456,116 B2 | 6/2013 | Burdick |
| 8,549,924 B2 | 10/2013 | Virtanen et al. |
| 9,056,663 B2 | 6/2015 | Bø |
| 9,308,618 B2 | 4/2016 | Benvegnu |
| 2008/0144442 A1 | 6/2008 | Combee et al. |
| 2010/0089126 A1 | 4/2010 | Sweeney |
| 2011/0000677 A1 | 1/2011 | Overfield |
| 2011/0093216 A1 | 4/2011 | Andersson et al. |

(Continued)

FOREIGN PATENT DOCUMENTS

WO    2008055515 A1    5/2008

*Primary Examiner* — Matthew R Buck
*Assistant Examiner* — Patrick Lambe
(74) *Attorney, Agent, or Firm* — Fletcher Yoder, P.C.

(57) ABSTRACT

To enable any measurement through the galvanic isolation of a subsea transformer, a topside system is used apply an AC voltage thereby generating a flux is the transformer core. The test is preferably done prior to any rotation in a subsea motor installed "behind" the transformer. Therefore, the voltage and frequency combination is be selected such that the torque produced is insufficient to rotate the motor. Impedance amplitude and phase are measured and then comparing the results of modeled fault scenarios. Faults such as, open circuits, short circuits, and loss of phase(s) can be detected prior to startup.

18 Claims, 2 Drawing Sheets

(56) References Cited

U.S. PATENT DOCUMENTS

| | | |
|---|---|---|
| 2011/0140820 A1 | 6/2011 | Guentert, III et al. |
| 2011/0316659 A1 | 12/2011 | Puchianu et al. |
| 2012/0001482 A1 | 1/2012 | Burdick |
| 2013/0063842 A1 | 3/2013 | Kataoka |
| 2013/0220625 A1 | 8/2013 | Billington et al. |
| 2014/0035504 A1* | 2/2014 | Rongve ............. G05B 23/0235 318/434 |
| 2014/0147243 A1 | 5/2014 | Torkildsen et al. |
| 2014/0209289 A1 | 7/2014 | Boot et al. |
| 2015/0188297 A1 | 7/2015 | Boe et al. |
| 2015/0346266 A1 | 12/2015 | Dimino et al. |
| 2016/0181964 A1 | 6/2016 | Nojima |

\* cited by examiner

IMPEDANCE MEASUREMENT BEHIND SUBSEA TRANSFORMER

TECHNICAL FIELD

The present disclosure relates to subsea power systems. More particularly, the present disclosure relates to fault detection in subsea power system components.

BACKGROUND

Subsea power systems today typically have very little access for any traditional measurement methods to determine the state of the system prior to energization. Some conventional fault detection tests can be performed from a topside surface facility, such as insulation resistance (IR) testing, continuity resistance (CR) testing, time domain reflectometer (TDR) testing, and applied voltage (HV AC) testing. A shortcoming of these methods is that they are not effective in measuring "behind" a subsea transformer. That is, the conventional testing methods generally give no information about the electrical status of components behind the galvanic isolation of the subsea transformer.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments, a method is described for detecting possible faults in subsea deployed power equipment installed behind, or electrically connected so as to be driven by, a subsea deployed transformer. The method includes applying an alternating current (AC) voltage signal from a topside surface facility to a set of three-phase conductor cores in an umbilical cable connecting the surface facility to the subsea deployed transformer, thereby generating flux in a core of the transformer. The AC voltage signal is insufficient to cause actuation of the power equipment connected to the transformer. The method further includes: measuring impedance amplitude and phase on the set of three-phase conductor cores; comparing the measured impedance amplitude and phase with reference impedance amplitude and phase values; and determining whether or not a fault is likely in the power equipment based on the comparison.

According to some embodiments, the reference impedance amplitude and phase values tend to indicate the existence of a fault in the power equipment. The reference values, for example, can be determined modeling various fault scenarios, including: open circuit, short circuit and loss of phase. The power equipment can be a subsea electric induction motor, for example, which drives fluid processing equipment such as subsea pumps, subsea compressors, or subsea separators. According to some embodiments, the fluid processing equipment is configured for processing a fluid produced from a subterranean hydrocarbon-bearing reservoir. According to some embodiments, the method is carried out after installation of and prior to first operation of the subsea deployed power equipment.

According to some embodiments, a system is described for detecting possible faults in subsea deployed power equipment installed behind, or electrically connected so as to be driven by, a subsea deployed transformer. The system includes: a topside power supply configured to apply an alternating current (AC) voltage signal to a set of three-phase conductor cores of an umbilical cable connecting the topside testing system to the subsea deployed transformer, thereby generating a flux in a core of the transformer; a topside measuring system configured to measure impedance amplitude and phase on the set of three-phase conductor cores; and a topside data processing system configured to compare the measured impedance amplitude and phase with reference impedance amplitude and phase values, and the determine therefrom whether or not a fault is likely in the power equipment.

According to some embodiments, one or more of the described systems and/or methods can be used in topside or subsea fluid processing equipment in an analogous fashion.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein are by way of example, and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

Figure 1:
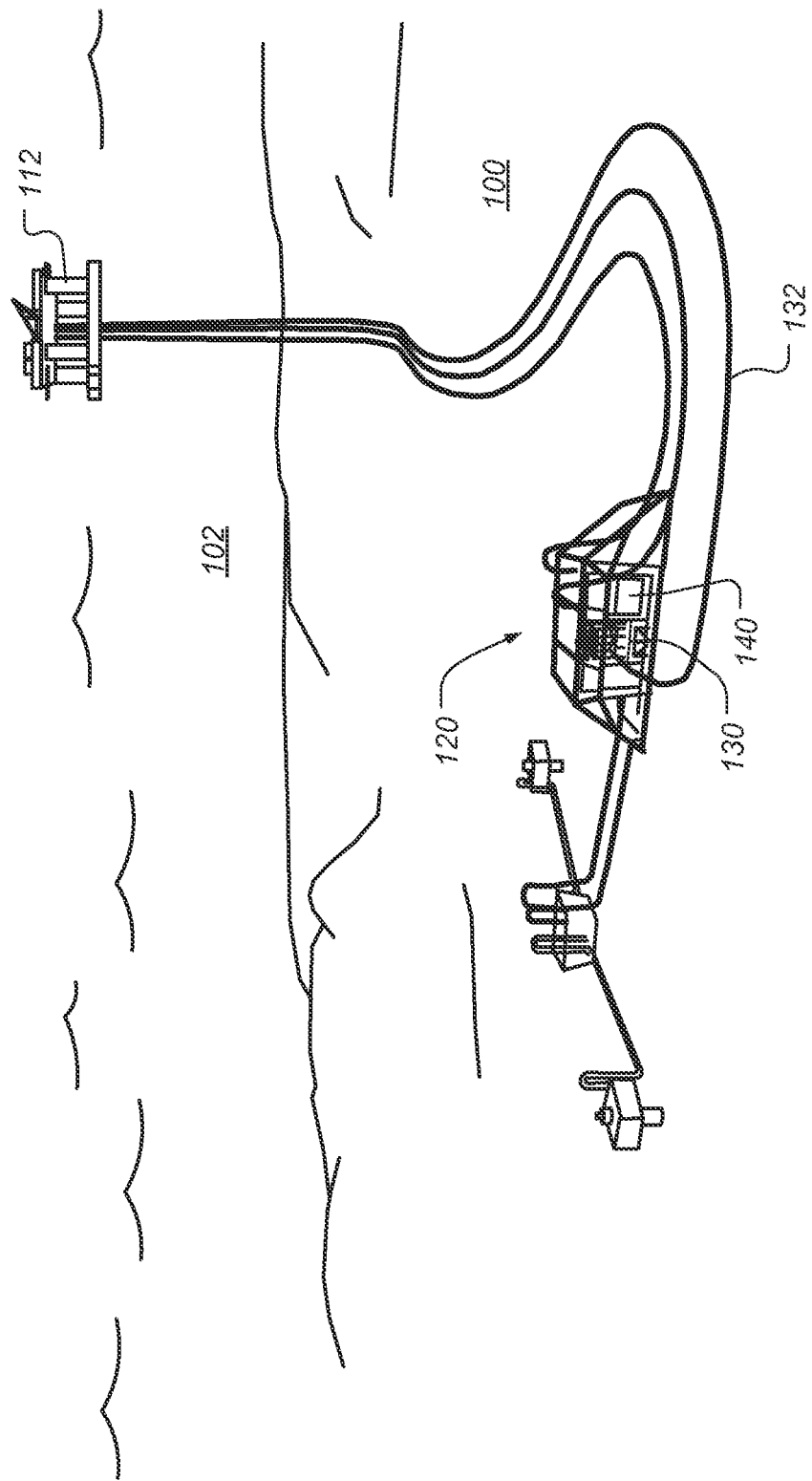
FIG. 1 is a diagram illustrating topside and subsea environments in which a system for making impedance measurements behind a subsea transformer can be deployed, according to some embodiments.

FIG. 1 is a diagram illustrating topside and subsea environments in which a system for making impedance measurements behind a subsea transformer can be deployed, according to some embodiments. On sea floor 100 a station 120 is shown which is downstream of several wellheads being used, for example, to produce hydrocarbon-bearing fluid from a subterranean rock formation. Station 120 includes a subsea pumping module 140, which is powered by an electric induction motor. The station 120 is connected to one or more umbilical cables, such as umbilical 132. The umbilicals in this case are being run from a platform 112 through seawater 102, along sea floor 100 and to station 120. In other cases, the umbilicals may be run from some other surface facility such as a floating production, storage and offloading unit (FPSO), or a shore-based facility. In order to reduce energy loss, the energy is transmitted through the umbilical 132 at higher voltages than is used by the electric motors in pump module 140. Station 120 thus also includes a step-down transformer 130, which converts the higher-voltage three-phase power being transmitted over the umbilical 132 to lower-voltage three-phase power for use by pump module 140. The umbilical 132 can also be used to supply barrier and other fluids, and control and data lines for use with the subsea equipment in station 120. Although a pumping module 140 is shown in FIG. 1, according to some embodiments the electric motor can also be used for other applications including subsea compressors and/or subsea separators.

Figure 2:
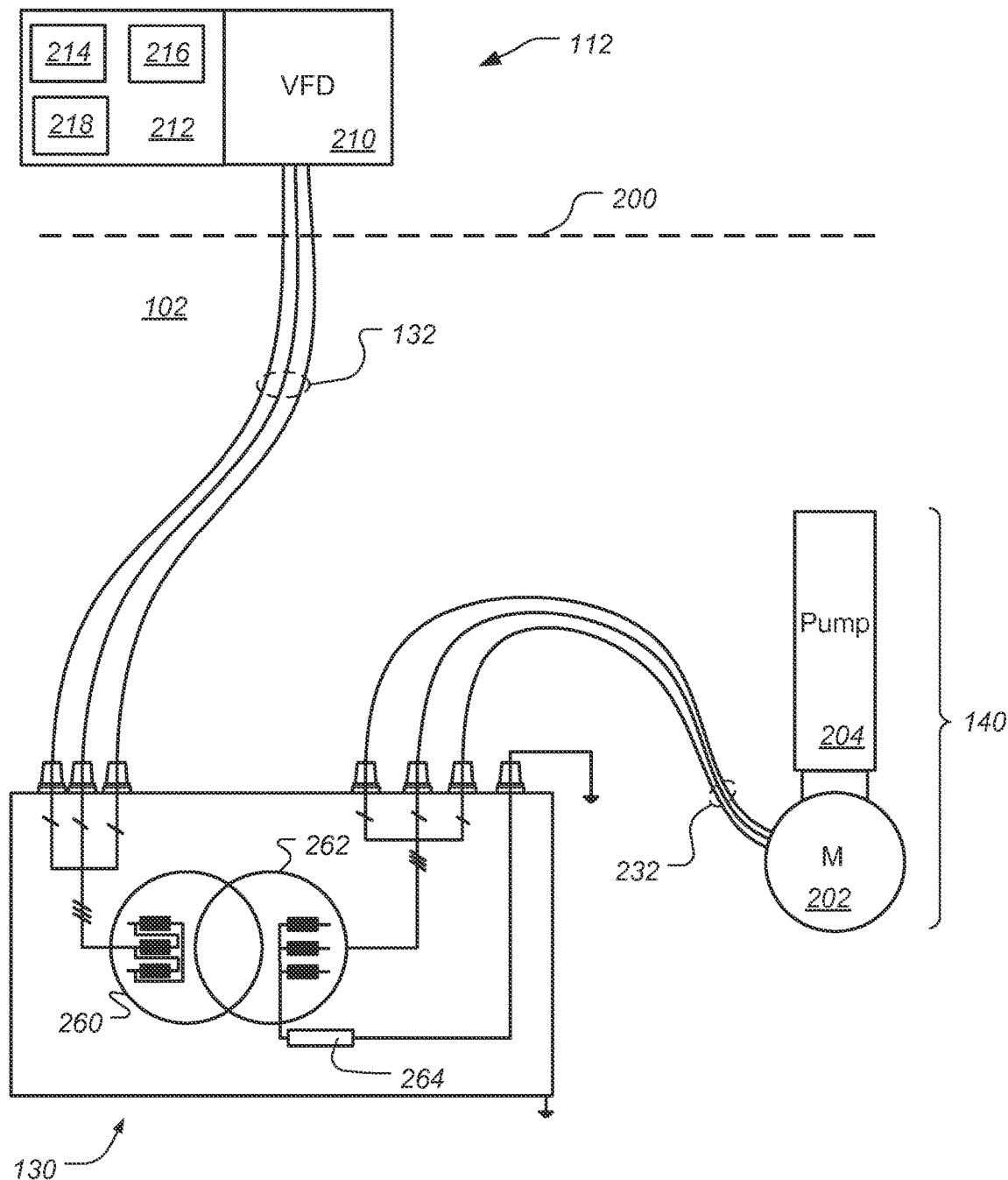
FIG. 2 is schematic diagram illustrating further details of system for making impedance measurements behind a subsea transformer, according to some embodiments.

FIG. 2 is schematic diagram illustrating further details of a system for making impedance measurements behind a subsea transformer, according to some embodiments. Above sea surface 200 on platform 112 is testing module 212, and variable frequency drive (VFD) 210. According to some embodiments, testing module 212 include impedance-measuring equipment 214, power supply circuitry 216, and data processing system 218 including a CPU. Below surface 200 in the subsea station 120 (shown in FIG. 1) is subsea transformer 130 with a transformer core, primary winding 260, secondary windings 262 and high resistance grounding (HRG) unit 264. "Behind" transformer 130 is pump module 140 that includes subsea electric motor 202 and pump unit 204. Motor 202 is attached to the secondary terminals of transformer 130 via a set of jumpers 232.

To enable measurement through the galvanic isolation of the subsea transformer 130, a method is used which generates a flux in the transformer core 260. This can be done by applying an alternating current (AC) voltage from topside (e.g. either VFD 210 or surface testing module 212) through the umbilical cable 132. In most cases it is desirable to perform the fault detection analysis prior to operation of the subsea equipment. In the case of a subsea motor 202 installed behind the transformer 130, the analysis should be done prior to any rotation of the subsea motor 202. Accordingly, the voltage and frequency combination is selected such that the torque produced is insufficient to rotate the motor.

According to one example, a grid frequency (e.g. 50 or 60 Hz) three-phase source power is applied through umbilical 132 using relatively low voltages (e.g. 400V or 480V compared with 22000V rated) that in most cases is too low to cause rotation of motor 202. Impedances are measured of both with amplitude and phase by testing module 212. According to some embodiments, modeling is used to generate a set of reference values for amplitude and phase which indicate various modeled fault conditions. In some cases, the reference values are determined empirically by setting up real components in a test setting. In other cases, a test setup can be used to validate modeling algorithms that are then used to generate the reference values. According to some embodiments, various types of faults including "open circuit", "short circuit", "loss of phase(s)" are modeled occurring in a number of different locations, including the secondary winding and connections within transformer 130, jumpers 232 and motor 202. When comparing the measured results with modeled fault scenarios behind the transformer, faults such as "open circuit", "short circuit", "loss of phase(s)" can be detected prior to startup of motor 202. These checks have been found to have high importance prior to applying high voltage and power to the system, as more severe damage can be prevented by limiting the power applied into the fault. Also, the tests can be done while the installation vessel is present, without operating the pump/compressor and prior to topside equipment being ready for use. This has a relatively large cost benefit, as mobilization time and cost is significant if a fault is found after vessel has been de-mobilized.

According to some embodiments, an example of electrical parameters that are measured (or determined based on measurements made) by testing module 212 include one or more of the following: impedance of each phase; rms current of each phase; phase shift of each phase; power factor of each phase; total active power; total reactive power; average phase shift; and average power factor. According to some embodiments the values for the measured or determined electrical parameters are compared with reference values that indicates one or more of the following conditions: no fault; single-phase-to-ground fault behind subsea transformer; two-phase-to-ground fault behind subsea transformer; three-phase-to-ground fault behind subsea transformer; phase-phase fault behind subsea transformer; three-phase fault behind subsea transformer; single-phase-open fault behind subsea transformer; two-phase-open fault behind subsea transformer; and three-phase-open fault behind subsea transformer. According to some embodiments, the measured or determined electrical parameters are also compared with reference values that indicate identical or similar types of faults occurring "in front" (i.e. electrically before the galvanic isolation) of the subsea transformer.

Although the embodiments thus far have been described in the context of subsea equipment for processing fluid produced by a hydrocarbon-bearing subterranean reservoir, according to some embodiments the techniques are applied to any subsea system that has components behind subsea transformers.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. A method for detecting possible faults in subsea deployed power equipment electrically connected so as to be driven by a subsea deployed transformer, the method comprising:
  applying an alternating current (AC) voltage signal from a topside surface facility to a set of three-phase conductor cores of an umbilical cable connecting the surface facility to the subsea deployed transformer thereby generating flux in a core of the subsea deployed transformer, the AC voltage signal being insufficient to cause actuation of the subsea deployed power equipment connected to the subsea deployed transformer;
  measuring impedance amplitude and phase on the set of three-phase conductor cores;
  modeling an open circuit fault in the subsea deployed power equipment to generate one or more reference impedance amplitude and phase values associated with the set of three-phase conductor cores of the umbilical cable that indicate one or more open circuit fault conditions in the subsea deployed power equipment;
  comparing the measured impedance amplitude and phase with the reference impedance amplitude and phase values; and
  determining whether or not the open circuit fault is likely in the subsea deployed power equipment prior to first operation of the subsea deployed power equipment based on comparing the measured impedance amplitude and phase with the reference impedance amplitude and phase values.

2. The method according to claim 1 wherein the subsea deployed power equipment is a subsea electric motor, and the AC voltage signal is insufficient to cause rotation of the motor.

3. The method according to claim 2 wherein the subsea motor is configured to drive fluid processing equipment of a type selected from a group consisting of: subsea pump, subsea compressor, and subsea separator.

4. The method of claim 1, wherein the AC voltage signal comprises a voltage of 400 to 480 volts.

5. The method of claim 1, wherein the AC voltage signal comprises a frequency of 50 to 60 Hertz.

6. The method of claim 1, wherein the one or more open circuit fault conditions comprise a single-phase-open fault condition behind the subsea deployed transformer, a two-phase-open fault condition behind the subsea deployed transformer, a three-phase open fault condition behind the subsea deployed transformer, or any combination thereof.

7. A system for detecting possible faults in subsea deployed power equipment electrically connected so as to be driven by a subsea deployed transformer, the system comprising:
a topside power supply configured to apply an alternating current (AC) voltage signal to a set of three-phase conductor cores of an umbilical cable connecting the topside power supply to the subsea deployed transformer thereby generating a flux in a core of the subsea deployed transformer, the AC voltage signal being insufficient to cause actuation of the subsea deployed power equipment connected to the subsea deployed transformer;
a topside measuring system configured to measure impedance amplitude and phase on the set of three-phase conductor cores; and
a topside data processing system configured to:
model a short circuit fault in the subsea deployed power equipment to generate one or more reference impedance amplitude and phase values associated with the set of three-phase conductor cores of the umbilical cable that indicate one or more short circuit fault conditions in the subsea deployed power equipment;
compare the measured impedance amplitude and phase with the reference impedance amplitude and phase values; and
determine whether or not the short circuit fault is likely in the subsea deployed power equipment prior to first operation of the subsea deployed power equipment based on comparing the measured impedance amplitude and phase with the reference impedance amplitude and phase values.

8. The system according to claim 7 wherein the subsea deployed power equipment is a subsea electric motor, and the AC voltage signal is insufficient to cause rotation of the motor.

9. The system according to claim 8 wherein the subsea motor is configured to drive fluid processing equipment of a type selected from a group consisting of: subsea pump, subsea compressor, and subsea separator.

10. The system according to claim 9 wherein the fluid processing equipment is configured for processing a fluid produced from a subterranean hydrocarbon-bearing reservoir.

11. The system of claim 7, wherein the first operation comprises any rotation of the subsea deployed power equipment.

12. The system of claim 7, wherein the short circuit fault occurs electrically after galvanic isolation of the subsea deployed transformer.

13. The system of claim 7, wherein the short circuit fault occurs electrically before galvanic isolation of the subsea deployed transformer.

14. A system, for detecting possible faults in subsea deployed power equipment electrically connected so as to be driven by a subsea deployed transformer, the system comprising:
a surface measuring system configured to measure impedance amplitude and phase on a set of three-phase conductor cores of an umbilical cable connecting a surface power supply to the subsea deployed transformer based on an alternating current (AC) voltage signal applied to the set of three-phase conductor cores of the umbilical cable by the surface power supply, wherein the AC voltage signal is insufficient to cause actuation of the subsea deployed power equipment connected to the subsea deployed transformer; and
a surface data processing system configured to:
model a loss of phase fault in the subsea deployed power equipment to generate one or more reference impedance amplitude and phase values associated with the set of three-phase conductor cores of the umbilical cable that indicate one or more loss of phase fault conditions in the subsea deployed power equipment;
compare the measured impedance amplitude and phase with reference impedance amplitude and phase values; and
determine whether or not the loss of phase fault is likely in the subsea deployed power equipment prior to first operation of the subsea deployed power equipment based on comparing the measured impedance amplitude and phase with the reference impedance amplitude and phase values.

15. The system according to claim 14, wherein the subsea deployed power equipment is a subsea electric motor, and the AC voltage signal is insufficient to cause rotation of the motor.

16. The system according to claim 15, wherein the subsea electric motor is configured to drive a subsea pump, a subsea compressor, or a subsea separator.

17. The system of claim 14, wherein the one or more loss of phase fault conditions comprise a no fault condition.

18. The system of claim 14, wherein the one or more loss of phase fault conditions comprise a single-phase-to-ground fault condition behind the subsea deployed transformer, a two-phase-to-ground fault condition behind the subsea deployed transformer, a three-phase-to-ground fault condition behind the subsea deployed transformer, a phase-phase fault condition behind the subsea deployed transformer, a three-phase fault condition behind the subsea deployed transformer, or any combination thereof.

* * * * *